C. V. NORDBERG.
CLUTCH.
APPLICATION FILED JUNE 7, 1919.

1,338,788.

Patented May 4, 1920.
3 SHEETS—SHEET 1.

C. V. Nordberg, Inventor

Witness

By C. A. Snow & Co.
Attorneys

C. V. NORDBERG.
CLUTCH.
APPLICATION FILED JUNE 7, 1919.
1,338,788.
Patented May 4, 1920.
3 SHEETS—SHEET 2.
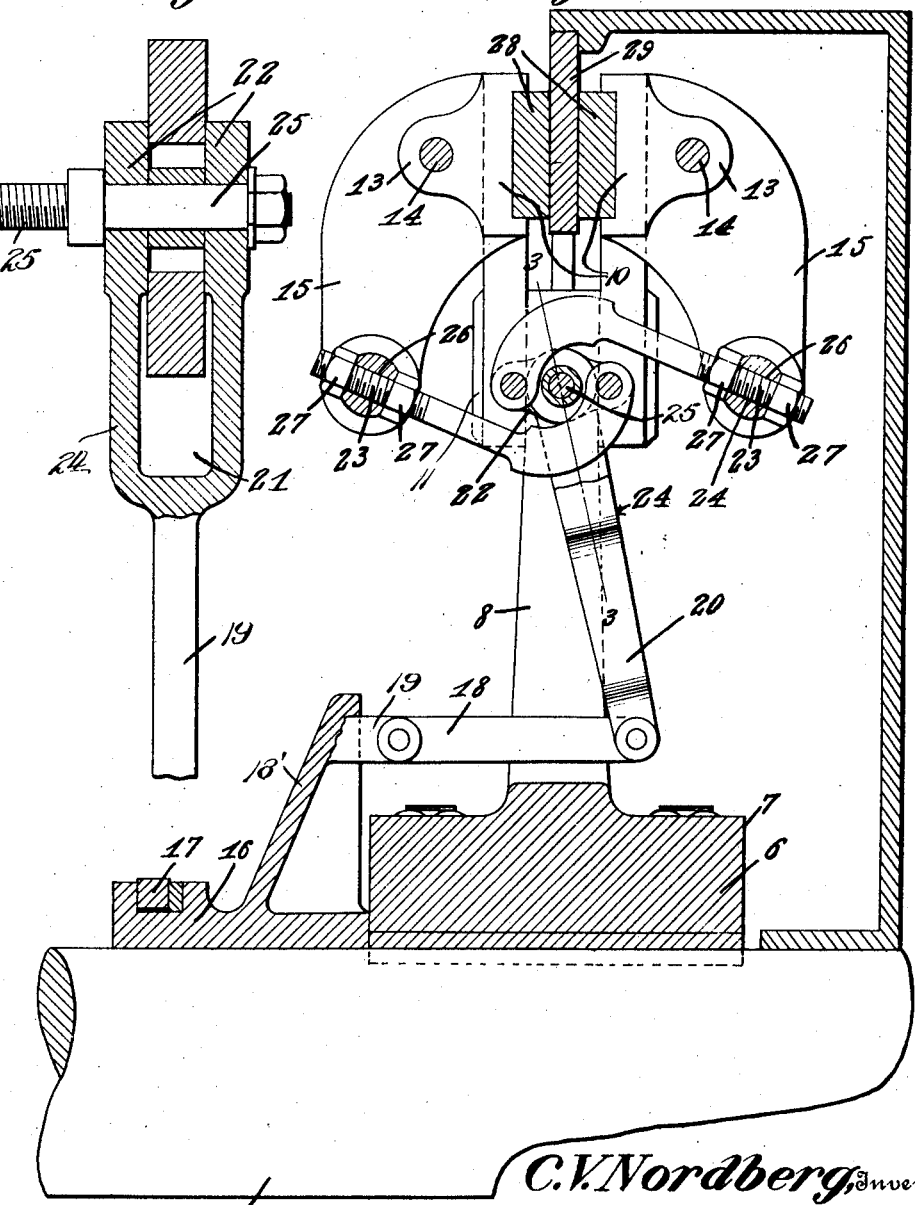

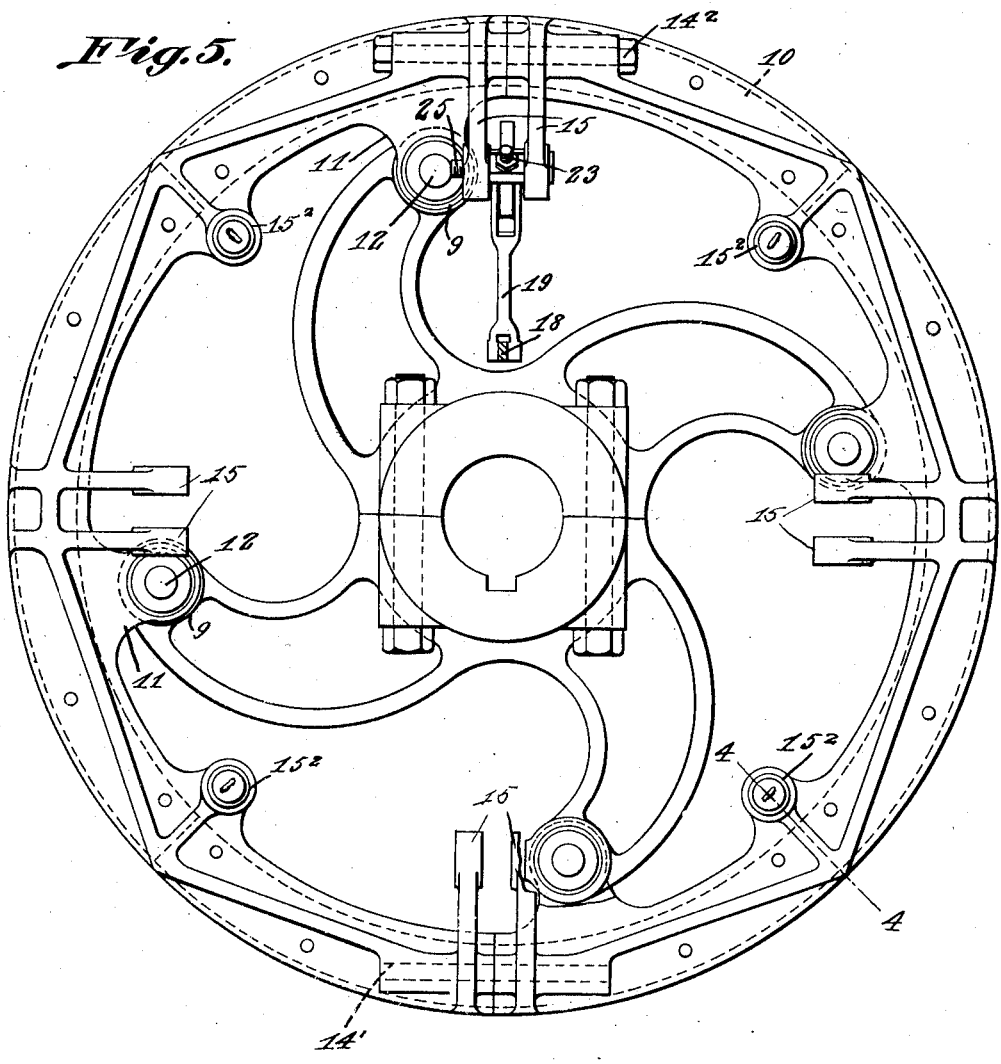

UNITED STATES PATENT OFFICE.

CARL VICTOR NORDBERG, OF BUTTE, MONTANA.

CLUTCH.

1,338,788. Specification of Letters Patent. Patented May 4, 1920.

Application filed June 7, 1919. Serial No. 302,452.

*To all whom it may concern:*

Be it known that I, CARL VICTOR NORDBERG, a citizen of the United States, residing at Butte, in the county of Silverbow and State of Montana, have invented a new and useful Clutch, of which the following is a specification.

This invention relates to a clutch, the principal object being to provide a clutch which is positive in operation both in applying and releasing the clutch.

A second object of the invention is to provide a clutch which may be used in connection with pulleys and disks of small diameter.

A further object of the invention is to provide a clutch and toggle motion therefor which will require but a short movement of the same in order to actuate the clutch in either operation of the same.

An additional object of the present invention is to provide a combined clutch and toggle motion which is simple in construction, which consists of few parts, and which can be manufactured and sold at a comparatively small cost.

With the above and other objects and advantages in mind, the invention embodies constructions, combinations of elements, arrangements and operations, and general assemblage, all of which will be fully set forth and illustrated in the accompanying drawings, wherein the preferred embodiment of the invention is shown.

In the drawings:—

Fig. 2 is a sectional view taken on line 2—2 of Fig. 1; and

Fig. 3 is a sectional view of one of the elements used in connection with my improved clutch and toggle motion.

Fig. 5 illustrates a side elevational view of the clutching members, the member operated on by the clutch being shown as removed, the same showing one of the clutch actuating members as applied.

Figure 1:
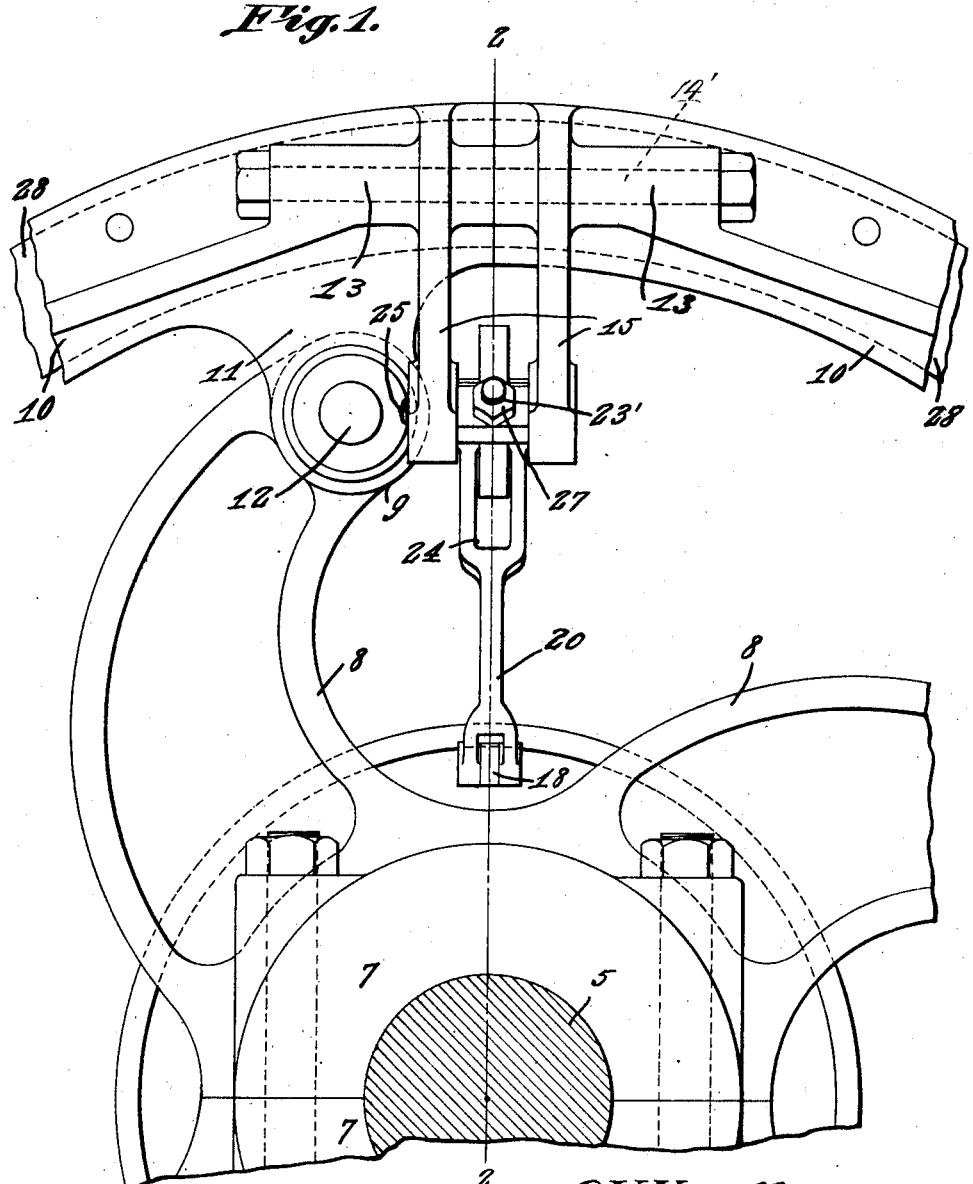
Figure 1 is an end elevation of a clutch and toggle motion constructed in accordance with my invention.

Referring in detail to the drawing whereis like characters of reference designate like parts in all the views, the numeral 5 denotes a rotary shaft, to which my invention is applied. My construction embodies a collar or boxing 6 which is keyed to the shaft 5. The collar 6 is formed of two semi-circular sections 7. Formed integral with the boxing 6 are radially disposed arms 8, each of which consists of a pair of parallel longitudinally curved bars which merge into eyes 9 at their outer ends.

Spaced circular rings or gripping members 10 are provided which are formed with inwardly extending ears 11 which are disposed at opposite sides of the eyes 9 and are secured thereto by bolts 12.

These gripping members 10 are supported on the bolts 12, in such relation, that the gripping members 10 may move longitudinally of the bolts 12, to accomplish the clutching result, to be hereinafter more fully described.

The gripping members 10, as shown, are formed in sections, each section being provided with an enlargement 13, which enlargements, when the sections are brought into proper relation with each other, coöperate to provide means for receiving the connecting bolts $14^2$, the enlargements being shown as provided with openings 14', to receive the bolts. It will thus be seen that when these bolts $14^2$, are properly positioned, the sections are secured together so that the same operate as a unit. Disposed on the members 10, are the laterally extending pairs of ears 15, the same being formed on the sections in spaced relation with each other, to provide supports for the bolts 25, to be hereinafter more fully described.

Figure 4:
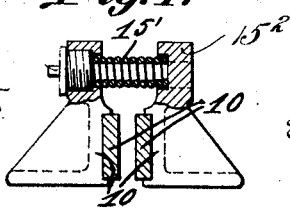
Fig. 4 illustrates a sectional view taken on line 4—4 of Fig. 5.

Each of the sections of the gripping members is provided with enlargements $15^2$, which enlargements, are disposed diametrically opposite each other, when the sections of the gripping members are properly assembled, these enlargements being constructed as more clearly shown by Fig. 4 of the drawings, and provide seats for the coiled springs 15', the threaded plugs 16', coöperating with the coiled springs 15', for adjusting the tension thereof, to restrict the movement of the gripping members 10, sothat an adjustment of the gripping members may be had to meet the requirements of the machinery, associated therewith, the action of the spring 15' being to normally urge the gripping members apart.

The operating mechanism includes a sliding collar 16, mounted on the shaft 5, associated therewith, and has connection with an operating ring 17, which in turn has connection with suitable operating mechanism, such as a lever, not shown, whereby movement of the ring longitudinally of the shaft 5, produces a relative movement of the collar.

This collar 16, is provided with a relatively large flange 18', which flange is provided with arms 19', having pivotal connection with the links 18, which links form a part of the respective actuating means, as illustrated by Fig. 2 of the drawings, the number of arms 19', being controlled by the number of actuating devices employed in connection with a particular clutch, since the actuating devices are operated simultaneously.

A link 20 is pivotally connected with the outer end of each of the links 18 and have their outer ends forked as indicated at 21. A bolt 21' extends through each of the forked ends of the links 20, ears or toggle connections 22 being formed integral with these forked ends of the links 20. A pair of toggle levers 23 is provided for each connection 22 and each is provided with a laterally curved inner end, which is pivotally connected with the ends of the toggle connection. The outer ends of the toggle levers 23 are provided with screw threads and are extended through openings 24 in gudgeon bolts 25, which are journaled in the inner end of each pair of ears 15 and nuts 25 are threaded upon the same outer ends of the toggle levers upon opposite sides of the gudgeon bolts.

Friction plates 28 are secured to the inner faces of these gripping members 10 and between which is disposed the inwardly extending flange 29 of the pulley or other member to be rotated.

In the operation of the device the clutch collar 16 is shifted on the shaft 5 to rock the links 20 which in turn rock the toggle levers 23 to move the gripping members 10 toward each other and to frictionally engage the inturned flange 29 of the member to be driven. Upon moving the collar 16 in the opposite direction these gripping members 10 are moved away from each other and disengage from the flange 29.

The construction here shown and described embodies the principles of my invention, but it is to be understood that the same may be modified in many respects, and that my limits of such modification are only governed by what is claimed.

What is claimed is:—

1. In a clutch mechanism, a shaft, a collar mounted on the shaft, and fixed to rotate therewith, radially disposed arms carried by the collar, a pair of circular plates carried by the collar, pairs of toggle links having their outer ends operatively connected with the circular plates, and their opposite ends laterally curved, operative connections between the laterally curved ends of the toggle links, a link for each of the connections whereby to rock the same, a slidable collar mounted on the shaft, and links carried thereby and pivotally connected with the first mentioned links.

2. In a clutch mechanism, a shaft, a collar secured thereto, radially disposed arms carried by the collar, a pair of laterally movable plates connected with each arm for contact with the member to be driven, said plates being equipped with oppositely disposed pairs of ears, a gudgeon bolt journaled between each pair of ears, a lever having a threaded end slidably associated with each gudgeon bolt, a notch threaded upon the lever upon opposite sides of said gudgeon bolt, a link connected to each pair of levers, and means for rocking said links.

3. In a clutch mechanism, a rotary shaft, a collar fixed to the shaft, radially disposed arms formed with the collar and having eyes formed at the outer ends thereof, circular gripping members, ears carried thereby, bolts for passing through the ears and eyes, the ears being slidable upon the bolts, a slidable collar mounted on the shaft, a plurality of links carried thereby, a plurality of links each having one end pivotally connected with each of the first-mentioned links, the outer end of the last-mentioned links being forked, a toggle connection mounted between each of the forked links, a pair of toggle levers for each of the forked links, the inner ends of the toggle links being laterally curved and pivotally connected with the ends of the toggle connection, the opposite end of the toggle connection being secured to the gripping members, and a member to be driven disposed between the gripping members and adapted to be driven by the same.

4. In a clutch mechanism, a rotary shaft, a collar keyed to the shaft, radially disposed arms formed with the collar and each consisting of a pair of longitudinally curved arms, eyes formed in the outer ends of the bars, a pair of gripping members arranged in parallel relation, ears carried thereby and disposed upon opposite sides of the eyes, bolts passing through the ears and eyes, the ears slidable upon the bolts, toggle links having their outer ends screw threaded, the threaded ends being engaged with the gripping members, the inner ends of the toggle links being laterally curved toward each other, a toggle connection for each pair of links having its ends pivotally connected with the same, a plurality of links each having its outer end forked and operatively connected with the toggle connections, the slidable collar, a plurality of rigid links carried thereby and pivotally connected with the forked links, and a member to be driven disposed between the gripping members.

In testimony that I claim the foregoing as my own, I have hereto affixed my signature in the presence of two witnesses.

CARL VICTOR NORDBERG.

Witnesses:
L. A. BEAKEY,
G. A. LANGREN.